United States Patent [19]

Waterman

[11] Patent Number: 5,760,228

[45] Date of Patent: Jun. 2, 1998

[54] HYDROXY ARYL TRIAZINE ULTRAVIOLET ABSORBERS

[75] Inventor: Paul Sheldon Waterman, Shelton, Conn.

[73] Assignee: Cytec Technology Corp., Wilmington, Del.

[21] Appl. No.: 481,110

[22] Filed: Jun. 7, 1995

Related U.S. Application Data

[63] Continuation of Ser. No. 198,238, Feb. 18, 1994, Pat. No. 5,461,151, which is a continuation of Ser. No. 605,199, Oct. 29, 1990, abandoned.

[51] Int. Cl.$^6$ .............................................. C07D 251/24
[52] U.S. Cl. ........................................................ 544/216
[58] Field of Search ............................................ 544/216

[56] References Cited

U.S. PATENT DOCUMENTS

| | | | |
|---|---|---|---|
| 3,118,887 | 1/1964 | Hardy et al. | 260/248 |
| 3,244,708 | 4/1966 | Duennenberger et al. | 260/248 |
| 3,268,474 | 8/1966 | Hardy et al. | 260/45.8 |
| 3,896,125 | 7/1975 | Helmo et al. | 260/249.5 |
| 4,356,307 | 10/1982 | Kelkenberg et al. | 546/200 |
| 4,520,171 | 5/1985 | Diveley et al. | 525/279 |
| 4,619,956 | 10/1986 | Susi | 524/87 |
| 4,740,542 | 4/1988 | Susi | 524/87 |
| 4,826,978 | 5/1989 | Migdal et al. | 544/216 |
| 4,863,981 | 9/1989 | Gugumus | 524/97 |
| 5,322,868 | 6/1994 | Valet et al. | 524/89 |

FOREIGN PATENT DOCUMENTS

| | | |
|---|---|---|
| 0711941A1 | 2/1986 | European Pat. Off. |
| 0434608A1 | 6/1991 | European Pat. Off. |
| 0444323A2 | 9/1991 | European Pat. Off. |
| 62-253657A | 11/1987 | Japan . |

OTHER PUBLICATIONS

European Patent Office Search Report for European Patent Appln. No. 91114903.7 dated Feb. 17, 1992.

*Primary Examiner*—Yogendra N. Gupta
*Attorney, Agent, or Firm*—Bart E. Lerman; Claire M. Schultz; Michael J. Kelly

[57] ABSTRACT

Provided are hydroxy aryl triazine ultraviolet absorbers of the general formula

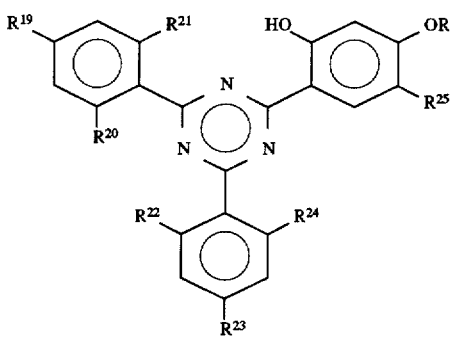

wherein $R^{19}$, $R^{23}$ and $R^{25}$ are independently selected from the group consisting hydrogen, hydroxy, alkyl of 1 to 12 carbon atoms, alkoxy of 1 to 12 carbon atoms, sulfonic, halo, carboxy, haloalkyl and acrylamino;

$R^{20}$, $R^{21}$, $R^{22}$ and $R^{24}$ are independently selected from the group consisting hydrogen, alkyl of 1 to 12 carbon atoms, alkoxy of 1 to 12 carbon atoms, sulfonic, halo, carboxy, haloalkyl and acrylamino; and the R moiety of the OR group is a linear, branched aliphatic or cycloaliphatic alkyl moiety containing 6 to 12 carbon atoms and is:

(1) substituted by one or more hydroxy groups, or (2) substituted by one or more alkoxy groups of 1 to 12 carbon atoms, the so-substituted moiety being further substituted by one or more hydroxy groups.

16 Claims, No Drawings

HYDROXY ARYL TRIAZINE ULTRAVIOLET ABSORBERS

This is a continuation of application Ser. No. 08/198,238, filed Feb 18, 1994, now U.S. Pat. No. 5,461,151, which is a continuation of application Ser. No. 07/605,199, filed October 29, 1990, now abandoned.

FIELD OF THE INVENTION

This invention relates to stabilization of polymers with hydroxy group-containing aryl triazine ultraviolet absorbers (UVA) in a synergistic combination with hindered amine light stabilizers (HALS).

BACKGROUND OF THE INVENTION

The use of UVAs by themselves or in combination with HALS to stabilize polymers such as coatings and plastics against light-induced degradation is an active area of research.

U.S. Pat. Nos. 3,118,887 and 3,268,474 disclose the stabilization of plastic and resinous compositions against the effects of ultraviolet light by incorporating therein one or more members of a class of tris-aryl triazines. It is further taught therein that at least one of the aryl groups is substituted by a hydroxyl group which is ortho to the point of attachment of the aryl group to the triazine nucleus.

U.S. Pat. Nos. 4,619,956 and 4,740,542 disclose a method of stabilizing a polymer film, coating, or a molded article against the action of light, moisture, or oxygen by incorporating aryl triazines and hindered amine light stabilizers (HALS) into said polymers. It is further disclosed that said triazines exhibited an enhanced degree of stabilization due to a synergistic effect when combined with certain hindered amine light stabilizers (HALS).

U.S. Pat. Nos. 3,244,708 and 3,896,125 describe related triazines.

Copending U.S. patent application Ser. No. 07/486,625 filed Feb. 28, 1990 describes an improved method of stabilizing polymers against the action of light. The method comprises incorporating, into a polymer, a concentrated solution of an aryltriazine. The triazine UVA of this method comprises an isomeric mixture of $C_6$ to $C_{12}$ alkyl group-containing and 2-hydroxyaryl triazines which are soluble in organic coatings solvents.

Even though aryl triazines of prior art are effective stabilizers of polymers and provide adequate protection against the action of light, moisture, and oxygen, discovery of new and more effective members of this class of ultraviolet stabilizers would be a welcome contribution to the art. It is the object of this invention to provide novel and substantially more effective aryl triazine type ultraviolet absorbers which are capable, in a synergistic combination with HALS, of stabilizing polymers such as coatings and plastics against the action of light, moisture, oxygen, or combination thereof.

SUMMARY OF THE INVENTION

This invention provides a novel synergistic ultraviolet absorber composition, an improved method of stabilizing polymers, and stabilized polymers containing the novel ultraviolet compositions of the invention.

DETAILED DESCRIPTION OF THE INVENTION

1. ULTRAVIOLET STABILIZER COMPOSITIONS OF THE INVENTION

The synergistic stabilizer composition comprises ingredients (A) and (B) as follows:

(A) a hydroxy-group containing aryl triazine ultraviolet absorber represented by Formula I:

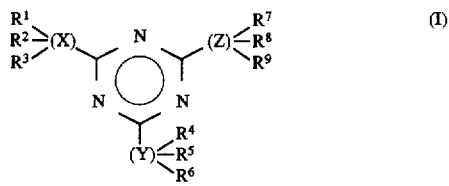

(I)

wherein X,Y,Z are each the same or different aromatic carbocyclic radicals, and at least one of the X, Y, and Z has a hydroxy group substituted ortho to the point of attachment to the triazine ring, and an OR group substituted at a point para to the attachment of the triazine ring and, wherein the R moiety of the OR group is, independently, a linear, branched aliphatic or cycloaliphatic alkyl moiety containing 1 to 12 carbon atoms and is:

(1) interrupted by one or more oxygen atoms;

(2) substituted by one or more hydroxy groups or alkoxy groups of 1 to 12 carbon atoms; or (3) both interrupted and substituted by the above groups of (1) and (2); and wherein $R^1$ to $R^9$ are selected from the group consisting of hydrogen, hydroxy, alkyl of 1 to 12 carbon atoms, alkoxy of 1 to 12 carbon atoms, sulfonic, halo, carboxy, haloalkyl, and acrylamino; and (B) a 2,2,6,6-tetraalkyl piperidine compound.

2. TRIAZINES OF THE INVENTION

The hydroxy group-containing triazines of this invention are represented by Formula I:

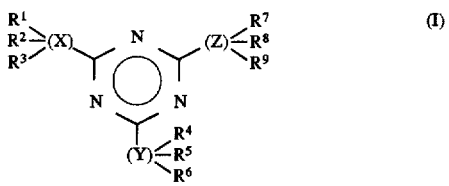

(I)

as described in the preceding section.

An example of the preferred embodiment of this invention is a class of triazines represented by Formula I-A:

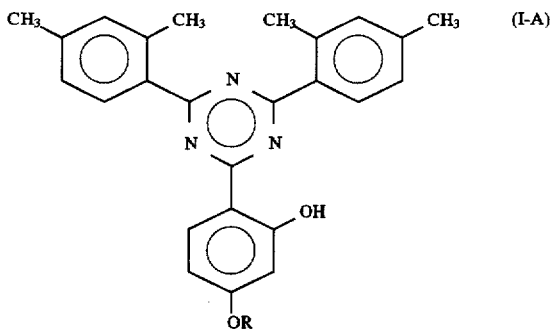

(I-A)

wherein the R moiety is, independently, a linear, branched aliphatic, or cycloaliphatic alkyl moiety of 1 to 12 carbon atoms, and is:

(1) both interrupted by one or more oxygen atoms; or (2) substituted by one or more hydroxy groups or alkoxy groups of 1 to 12 carbon atoms; or (3) both interrupted and substituted by the above groups of (1) and (2).

3. PREPARATION OF TRIARYL TRIAZINES USED IN THE COMPOSITION OF THE INVENTION

General methods for preparing triaryl triazines have been disclosed in U.S. Pat. Nos. 3,118,887 and 3,268,474. However, the prior art does not teach alkylation products of hydroxyaryl triazines with oxygen-containing alkyl halides to produce the oxygen group-containing triaryl triazine UV absorbers of this invention.

The process for preparing the triazines comprises alkylating with oxygen-containing alkyl halides a polyhydroxy triaryl triazine represented by the Formula (II) below:

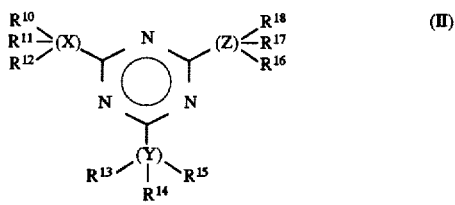

wherein X, Y, and Z are each the same or different aromatic carbocyclic radicals, and at least one of X, Y, and Z has two hydroxy groups having positions, respectively, ortho and para to the point of attachment to the triazine ring, and $R^{10}$ to $R^{18}$ are selected from hydrogen, hydroxy, alkyl, alkoxy, sulfonic, carboxy, halo, haloalkyl, and acylamino.

Preferred triaryl triazine reactants suitable for alkylation with oxygen-containing alkyl halides are represented by the Formula (III):

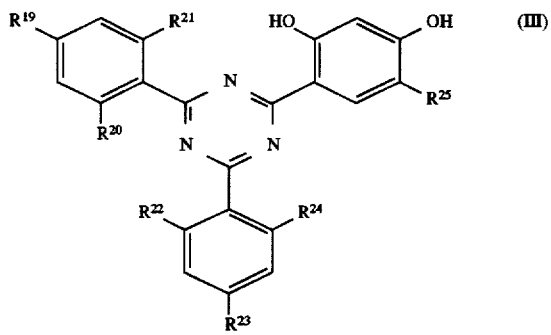

wherein $R^{19}$, $R^{20}$, $R^{21}$, $R^{22}$, $R^{23}$, $R^{24}$, and $R^{25}$ are selected from a group consisting of hydrogen and one to twelve carbon alkyl groups. The product of the reaction is represented by Formula below:

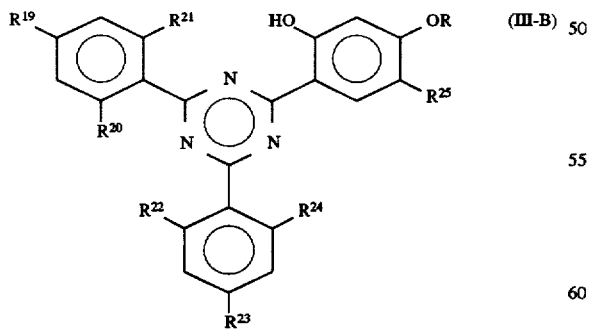

wherein $R^{19}$, $R^{20}$, $R^{21}$, $R^{22}$, $R^{23}$, $R^{24}$ and $R^{25}$ are selected from a group consisting of hydrogen and one to twelve carbon alkyl groups; and wherein the R moiety of the OR group is, independently, a linear, branched aliphatic, or cycloaliphatic alkyl moiety of 1 to 12 carbon atoms:

(1) interrupted by one or more oxygen atoms; or (2) substituted by one or more hydroxy groups or alkoxy groups of 1 to 12 carbon atoms; or (3) both interrupted and substituted by the above groups (1) and (2).

A preferred method comprises monoalkylating the triazine of Formula III with an oxygen-containing alkylhalide.

The triaryl triazine UVA composition ingredient may also be substituted by ortho-hydroxy groups on 2 or 3 of the aromatic carbocyclic rings attached to the triazine nucleus. However, these poly-ortho-hydroxy type triazines, although effective as ultraviolet absorbers, are generally more highly colored than mono-ortho-hydroxy type triazines. Consequently, the mono-ortho-hydroxy triazines prepared from triaryl triazines of Formula III are generally preferred in stabilizing compositions for stabilization of coatings.

An illustration of a specific triaryl triazine reactant useful for practicing the method of this invention is 2-(2,4-dihydroxyphenyl)-4,6-bis-(2,4-dimethylphenyl)-1,3,5-triazine (I-B).

The oxygen-containing alkyl halides suitable for preparing the triazine ingredient of the composition of the invention are generally chlorides, bromides, and iodides, with chlorides being preferred because of cost and availability. In cases where the alkyl halide is an epichlorohydrin, its epoxy form could be used advantageously (viz. I-C and I-G). It is well known in the art that epichlorohydrins produce the corresponding epoxides under basic conditions.

The alkyl halide reactant predominantly reacts with the hydroxyl group in the para positions in triazines represented by formulae II and III. The para hydroxyl group is more reactive than the ortho position hydroxyl and its predominant reaction is accomplished by using no more than about a 10% stoichiometric excess of alkyl halide reactant per mole of para hydroxy group on the triazine reactant. Other reaction conditions which favor predominant reaction of the para hydroxyl group are:

(i) use of a catalyst, and (ii) use of reaction temperatures below 200° C.

A typical triazine is prepared by the reaction of a heteroatom group-containing alkyl halide with 2-(2,4-dihydroxy-phenyl)-4,6-di-(2,4-dimethyl-phenyl)-1,3,5-triazine I-B:

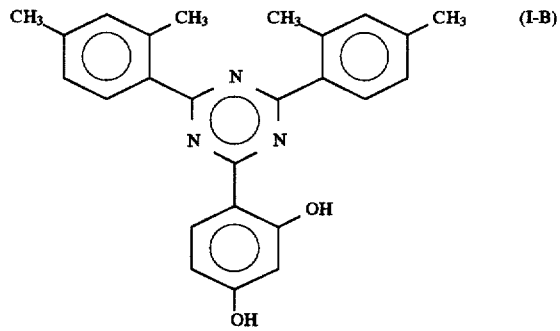

to give the monoalkylation product I-A:

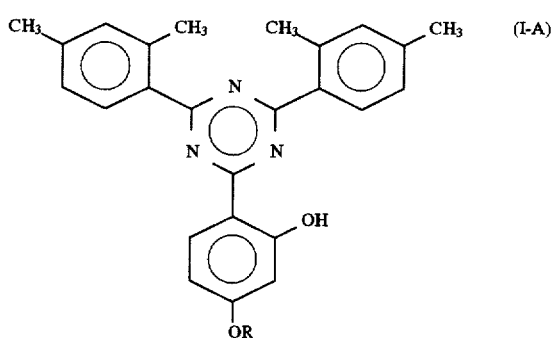

The alkylating agent is represented by the formula:

R—X wherein R—X is an oxygen-containing alkyl, and X is a halogen selected from choride, bromide, and iodide.

Other X groups are also acceptable if they are capable of undergoing nucleophilic substitution reactions or, otherwise, are referred to as "good leaving groups." Examples of "good leaving groups" are $RSO_3$—, $ROSO_3$—, $R_2S$—, $RCO_2$—, $R_2PO_2$—, $ClO_4$, $NO_3$—.

Other alkylation methods known in prior art may also be used to prepare some of the novel triazines or this invention. Ethylene oxide, for example, produces a hydroxyethyl-substituted triazine (I-C) by an alkylation reaction involving ring opening of ethylene oxide. Alkylation with excess ethylene oxide or ethylene chlorohydrin gives the triazine I-D with repeating units of —$CH_2CH_2O$— groups.

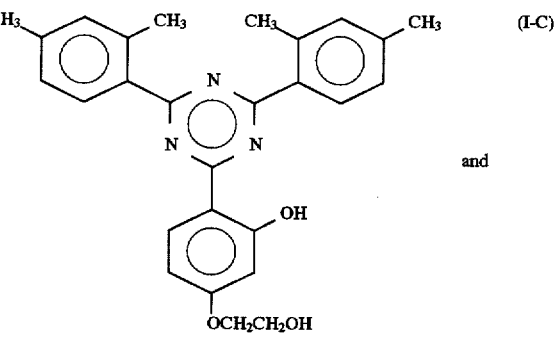

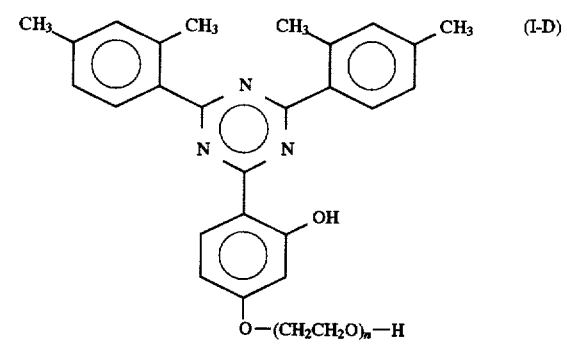

Triazine I-E can be prepared by the base-catalyzed reaction of 2-(2,4-dihydroxyphenyl)-4,6-di(2,4-dimethylphenyl)-1,3,5-triazine (I-B) with 6-chloro-1-hexanol by the process of this invention and is represented by Formula I-E:

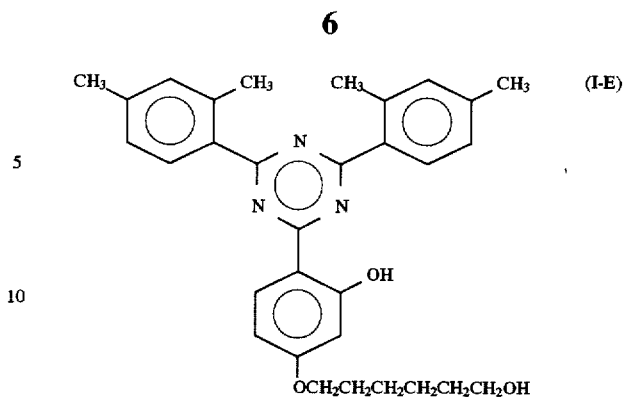

In the preparation of triazine I-E, it is of course possible to obtain, in addition to triazine I-E, small amounts of another triazine compound containing repeating units of —($CH_2CH_2CH_2CH_2CH_2CH_2O$)— as represented by the Formula I-F:

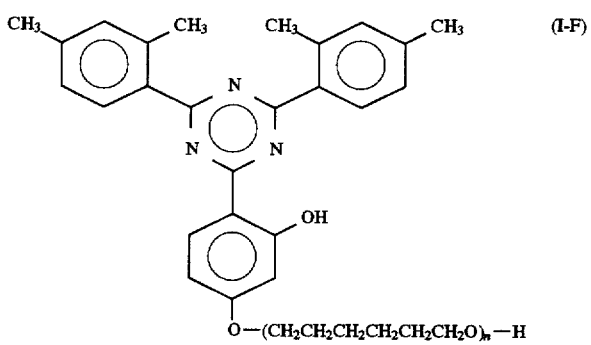

The presence of small amounts of triazine I-F in triazine I-E is permissible and sometimes even beneficial since presence of oligomers may improve the compatibility of the triazine ultraviolet absorber in coatings compositions.

4. THE 2,2,6,6-TETRAALKYL PIPERIDINE COMPOUNDS USED IN THE COMPOSITION OF THE INVENTION

The HALS useful in the method of this invention are 2,2,6,6-tetraalkylpiperidines, their acid addition salts or complexes with metal compounds. These HALS are well known in the art and include compounds which contain a group represented by Formula II:

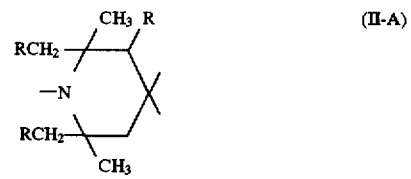

wherein R is hydrogen or methyl.

HALS utilizable in this invention also include, but are not limited to, compounds represented by the following:

1. Formula III-A

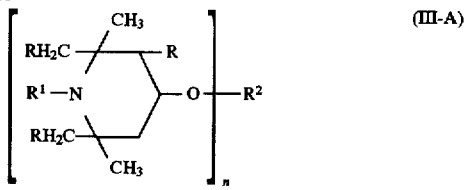

wherein:

n is a number from 1–4 inclusive, preferably 1 to 2;

R is as defined in Formula II-A;

R¹ is hydrogen, oxyl, hydroxy, $C_1$ to $C_{18}$ alkoxy, alkyl, $C_3$–$C_{18}$ alkenyl or alkynyl, $C_7$–$C_{12}$ aralkyl, $C_1$–$C_8$ alkanoyl, $C_3$–$C_5$ alkenoyl, glycidyl, a group —$CH_2CH$(OH)—Z wherein Z is hydrogen, methyl or phenyl, with R¹ preferably being hydrogen, $C_1$–$C_{12}$ alkyl, allyl, benzyl, acetyl or acryloyl;

R², when n is 1, is hydrogen, $C_1$–$C_8$ alkyl optionally interrupted by one or more oxygen atoms, cyanoethyl, benzyl, glycidyl, a monovalent radical of an aliphatic, cycloaliphatic, araliphatic or aromatic carboxylic acid, or of carbamic acid, or of a phosphorous-containing acid, or a monovalent silyl radical, preferably a radical of an aliphatic carboxylic acid having 2–18 carbon atoms, of a cycloaliphatic carboxylic acid having 5–12 carbon atoms or of an aromatic carboxylic acid having 7–15 carbon atoms;

R², when n is 2, is $C_1$–$C_{12}$ alkylene, $C_4$–$C_{12}$ alkenylene, xylylene, a bivalent radical of an aliphatic, cycloaliphatic, araliphatic or aromatic dicarboxylic acid, of a dicarbamic acid or of a phosphorus-containing acid, or a bivalent silyl radical, preferably a radical of an aliphatic dicarboxylic acid having 2–36 carbon atoms, of a cycloaliphatic or aromatic dicarboxylic acid having 8–14 carbon atoms, or of an aliphatic, cycloaliphatic or aromatic dicarbamic acid having 8–14 carbon atoms;

R², when n is 3, is a trivalent radical of an aliphatic, cyclolaliphatic or aromatic tricarboxylic acid, of an aromatic tricarbamic acid or of a phosphorus-containing acid, or a trivalent silyl radical; and R², when n is 4, is a tetravalent radical of an aliphatic, cycloaliphatic or aromatic tetracarboxylic acid;

2. Formula IV

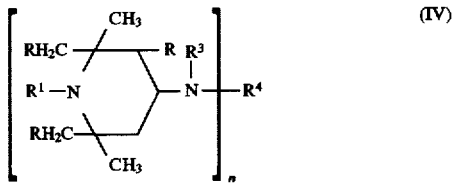

wherein n is the number 1 or 2;

R is as defined in Formula II-A;

R¹ is as defined in Formula III-A;

R³ is hydrogen, $C_1$–$C_{12}$ alkyl, $C_5$–$C_7$ cycloalkyl, $C_7$–$C_8$ aralkyl, $C_2$–$C_{18}$ alkanoyl, $C_3$–$C_5$ alkenoyl or benzoyl;

R⁴, when n is 1, is hydrogen, $C_1$–$C_{18}$ alkyl, $C_5$–$C_7$ cycloalkyl, $C_1$–$C_8$ alkenyl unsubstituted or substituted by a cyano, carbonyl or carbamide group, or it is glycidyl, a group of the formula —$CH_2$—$CH(OH)$—Z or of the formula —CONH—Z wherein Z is hydrogen, methyl or phenyl;

R⁴ when n is 2, is $C_2$–$C_{12}$ alkylene, $C_6$–$C_{12}$ arylene, xylylene, a —$CH_2$—$CH(OH)$—$CH_2$—$CH(OH)$—$CH_2$— wherein X is $C_2$–$C_{10}$ alkylene, $C_6$–$C_{15}$ arylene or $C_6$–$C_{12}$ cycloalkylene;

or, provided that R³ is not alkanoyl, alkenoyl or benzoyl, R⁴ can also be a bivalent radical of an aliphatic, cycloaliphatic or aromatic dicarboxylic acid or dicarbamide acid, or can be the group —CO— or R³ and R⁴ together, when n is 1, can be the cyclic radical of an aliphatic or aromatic 1,2- or 1,3-dicarboxylic acid;

3. Formula V

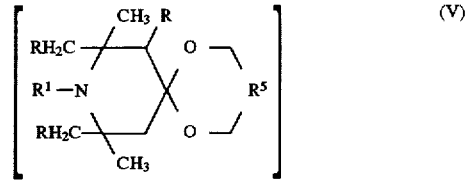

wherein:

n is the number 1 or 2;

R is as defined in Formula II-A;

R¹ is as defined in Formula III-A;

R⁵, when n is 1, is $C_2$–$C_8$ alkylene or hydroxyalkylene or $C_4$–$C_{22}$ acyloxyalklyene; and R⁵, when n is 2, is the group (—$CH_2$)$_2$C(CH$_2$—)$_2$;

4. Formula VI

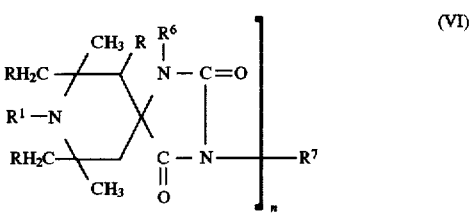

wherein:

n is the number 1 or 2;

R is as defined in Formula II-A;

R¹ is as defined in Formula III-A:

R⁶ is hydrogen, $C_1$–$C_{12}$ alkyl, allyl, benzyl, glycidyl or $C_2$–$C_6$ alkoxyalky;

R⁷, when n is 1, is hydrogen, $C_1$–$C_{12}$ alkyl, $C_3$–$C_5$ alkenyl, $C_7$–$C_9$ aralkyl, $C_5$–$C_7$ cycloalkyl, $C_2$–$C_4$ hydroxyalkyl, $C_2$–$C_6$ alkoxyalkyl, $C_6$–$C_{10}$ aryl, glycidyl, a group of the formula —(CH)—COO—Q or of the formula —(CH$_2$)$_m$—O—CO—Q wherein m is 1 or 2, and Q is $C_1$–$C_4$ alkyl or phenyl; or R⁷ when n is 2 is $C_2$–$C_{12}$ alkylene, $C_6$–$C_{12}$ arylene, a group —$CH_2$—CH—(OH)—$CH_2$—O—X—O—$CH_2$—CH(OH)$CH_2$— wherein X is $C_2$–$C_{10}$ alkylene, $C_6$–$C_{15}$ arylene or $C_6$–$C_{12}$, cycloalkylene, or a group —$CH_2CH(OZ')CH_2$—(OCH$_2$—CH(OZ')—CH$_2$)$_2$— wherein Z' is hydrogen, $C_1$–$C_{18}$ alkyl, allyl, benzyl, $C_2$–$C_{12}$ alkanoyl or benzoyl;

5. Formula VII

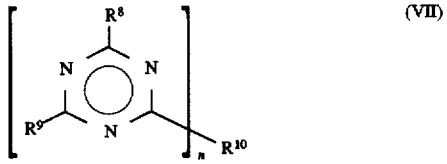

Wherein:

n is the number 1 or 2;

$R^8$ is a group of the formula:

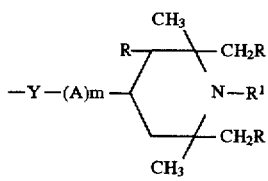

wherein:

R is as defined in Formula II-A;

$R^1$ is as defined in Formula III-A, Y is —O— or —$NR^{11}$—; A is $C_2$–$C_6$ alkylene;

m is the number 0 or 1;

$R^9$ is the groups $R^8$, $NR^{11}$, $R^{12}$, $OR^{13}$, —$NHCH_2OR^{13}$ or —$N(CH_2OR^{13})_2$;

$R^{10}$ when n is 1, is the groups $R^8$ or $R^9$;

$R^{10}$, when n is 2, is the group —Y—Q—Y— wherein Q is $C_2$–$C_6$ alkylene optionally interrupted by —$N(R^{14})$—;

$R^{11}$ is $C_1$–$C_{12}$ alkyl, cyclohexyl, benzyl or $C_1$–$C_4$ hydroxyalkyl, or a group of the formula

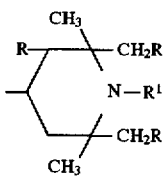

$R^{12}$ is $C_1$–$C_{12}$ alkyl, cyclohexyl, benzyl or $C_1$–$C_4$ hydroxyalkyl;

$R^{13}$ is hydrogen, $C_1$–$C_{12}$ alkyl or phenyl;

$R^{14}$ is hydrogen or the group —$CH_2OR^{13}$; or $R^1$ and $R^2$ together are $C_4$–$C_5$ alkylene or oxaalkylene; or $R^1$ and $R^2$ are each a group of the formula

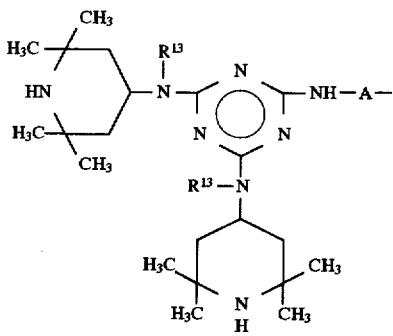

6. Formula VIII

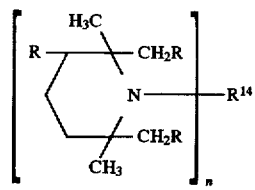

wherein:

n is the number 1 or 2;

R is as defined in Formula II-A;

$R^{14}$, when n is 1, is $C_4$–$C_{18}$ alkyl, $C_7$–$C_{12}$ aralkyl, the group —CO—$R^{15}$, or $C_1$–$C_4$ alkyl which is substituted by —CN, —$COOR^{16}$, —OH, —$OCOR^{17}$, or oxyl, hydroxy, $C_1$ to $C_{18}$ alkoxy, or

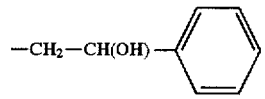

wherein:

$R^{15}$ is $C_1$–$C_{12}$ alkyl, $C_2$–$C_4$ alkenyl or phenyl, $R^{16}$ is $C_1$–$C_{18}$ alkyl, $R^{17}$ is $C_1$–$C_{18}$ alkyl, $C_2$–$C_{10}$ alkenyl, cyclohexyl, benzoyl or $C_6$–$C_{10}$ aryl; or $R^{14}$, when n is 2, is $C_4$–$C_{12}$ alkylene, 2-butenylene-1,4-xylylene, the group —$(CH_2)_2$—OOC—$R^{18}$—COO—$(CH_2)_2$— or the group —$CH_2$—OOC—$R^{19}$—COO—$CH_2$— wherein $R^{18}$ is $C_2$–$C_{10}$ alkylene, phenylene or cyclohexylene, and $R^{19}$ is $C_2$–$C_{10}$ alkylene, xylylene or cyclohexylene;

7. Formula IX

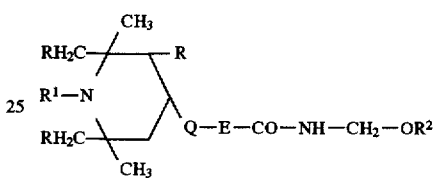

wherein:

Q is —$N(R^3)$— or —O—;

E is $C_1$–$C_3$ alkylene, the group —$CH_2$—CH ($R^4$)—O— wherein R is hydrogen, methyl or phenyl, the group —$(CH_2)_3$—NH— or a single bond;

R is hydrogen or methyl;

$R^1$ is hydrogen, oxyl, hydroxy, $C_1$ to $C_{18}$ alkoxy, $C_1$–$C_8$ alkyl, $C_3$–$C_8$ alkenyl, $C_3$–$C_8$ alkynyl, $C_7$–$C_{12}$ aralkyl, $C_1$–$C_8$ alkanoyl, $C_3$–$C_5$ alkenoyl or glycidyl;

$R^2$ is hydrogen of $C_1$–$C_{18}$ alkyl;

$R^3$ is hydrogen, $C_1$–$C_{18}$ alkyl, $C_5$–$C_7$ cycloalkyl, $C_7$–$C_{12}$ aralkyl, cyanoethyl, $C_6$–$C_{10}$ aryl, the group —$CH_2$—$CH(R^4)$—OH wherein $R^4$ has the meaning defined above, a group of the formula

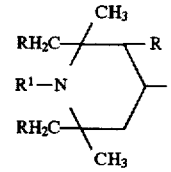

or a group of the formula

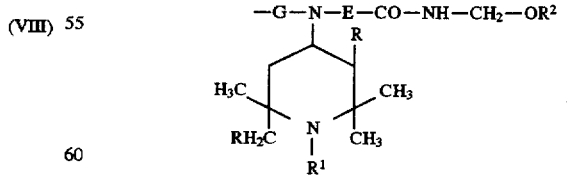

wherein

G can be $C_2$–$C_6$ alkylene or $C_6$–$C_{12}$ arylene; or $R^3$ is a group —E—CO—NH—$CH_2$—$OR^2$; and 8. Polymeric compounds of which the recurring structural unit contains a polyalkylpiperidine radical of Formula II-A, especially polyester, polyethers, polyamides, polyamines, polyurethanes, polyureas, polyaminotriazines, and copolymers thereof which contain such radicals. The aforementioned HALS (1–8) are described in detail in U.S. Pat. No. 4,426,472. It is also possible to use polyalkylpiperidine derivatives of the above Formulas III-A to IX which form chemical bonds with the binder of the lacquer. This is the case when the polyalkylpiperidine derivative possesses a reactive group suitable for this purpose, for example a glycidyl group or a methylol group. Examples of such compounds are the polyalkyl-piperidine derivatives of Formula IX containing methylol or methylol ether groups. Polyalkylpiperidine derivatives which are basic compounds can form salts with acids. Examples of suitable acids for such salt formation include but are not limited to inorganic acids or organic carboxylic, sulfonic, phosphonic or phosphinic acids, such as hydrochloric acid, boric acid, phosphoric acid, acetic acid, salicylic acid, toluenesulfonic acid or benzenephosphonic acid. The polyalkylpiperidine compounds can form complexes with complex-forming metal compounds, for example, with zinc-II-acetate, cobalt-II-acetylacetonate, nickel-II-acetylacetonate, aluminum-III-acetyl-acetonate, nickel-II-benzoate or aluminum-III-benzoylacetonate.

Preferred HALS to be used with the UVA in the methods of this invention are represented by Formula X:

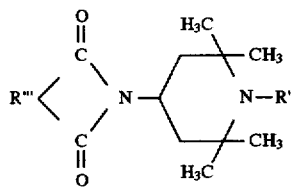

wherein

R'" is a saturated or unsaturated, optionally alkyl- or alkenyl-substituted alkylene or cycloalkylene radical having 2–20 C-atoms and R' is selected from the group consisting of:

hydrogen;

oxyl; hydroxy; $C_1$ to $C_{18}$ alkoxy;

an alkyl radical having 1–20 C-atoms with methyl being preferred;

an alkenyl radical having 3–5 C-atoms;

an aralkyl radical having 7–12 C-atoms;

—$CH_2$—$CH_2$—CN;

—$CH_2$—$CH_2$—COO—alkyl;

an acyl radical; and —$(CH_2$—$CH_2O)_n$H, wherein n is 1–10.

In Formula X, R'" is preferably

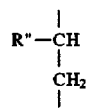

wherein R" is a $C_{12}$–$C_{18}$ alkyl group; a cycloalkylene group; 1,2-cyclohexanediyl or methyl-substituted 1,2-cyclohexanediyl radicals; or a bicyclic divalent aliphatic radical. The HALS represented by Formula X are described in detail in U.S. Pat. No. 4,356,307.

Among the aforementioned HALS, the following HALS, when used with the UVA in the methods of this invention, are particularly preferred:

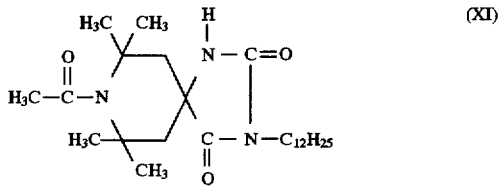

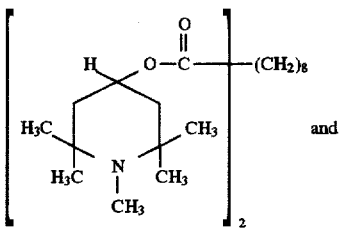

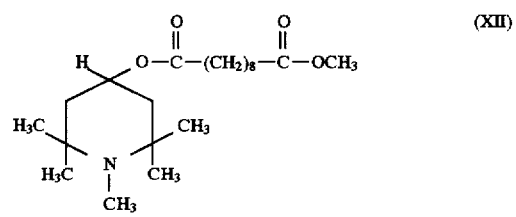

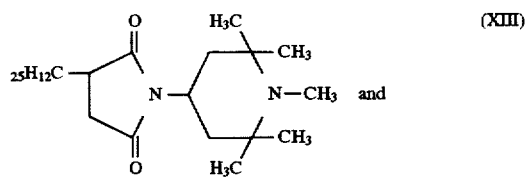

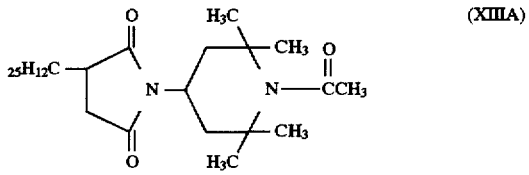

Compounds of Formula XI and the mixture in XII are available from Ciba-Geigy as Tinuvin® 440. and Tinuvin® 765, respectively, brand of HALS.

In addition to the synergistic HALS and UVA combinations, further known stabilizers and co-stabilizers can also be incorporated in the polymers stabilized. These stabilizers can be for example:

1. Antioxidants which are alkylated phenols, alkylated hydroquinones, hydroxylated thiophenyl ethers, alkylidene-bisphenols, benzyl compounds, acylaminophenols, esters of β-(3,5-di-tert-butyl-4-hydroxyphenyl)propionic acid with monohydric or polyhydric alcohols, and amides of β-(3,5-di-tert-butyl-4-hydroxyphenyl)propionic acid;
2. Other ultraviolet light stabilizers;
3. Metal deactivators;
4. Phosphites phosphonites, and phosphines;
5. Compounds which decompose peroxides such as phosphites, phosphonites, and thioesters;
6. Nucleating agents;
7. Fillers; and
8. Other additives, for example, plasticizers, lubricants, emulsifiers, pigments, fluorescent whitening agents, flameproofing agents, antistatic agents and blowing agents.

Proportions of Stabilizers

The HALS are generally used in amounts within the range of from about 0.01 to about 5 wt % based on the weight of total resin solids. The UVA of this invention are used in amounts within the range of from about 0.01 to about 5 wt % based on the weight of total resin solids. The weight ratio of HALS to UVA is from about 500:1 to about 1:500 with ratios of from 5:1 to 1:5 being preferred.

Synergistic Combinations

The UVA of this invention represented by Formula (I-A) are synergistically combined with the HALS represented by Formula (X) to produce synergistically stabilized coatings. For example, the preferred synergistic combination is:

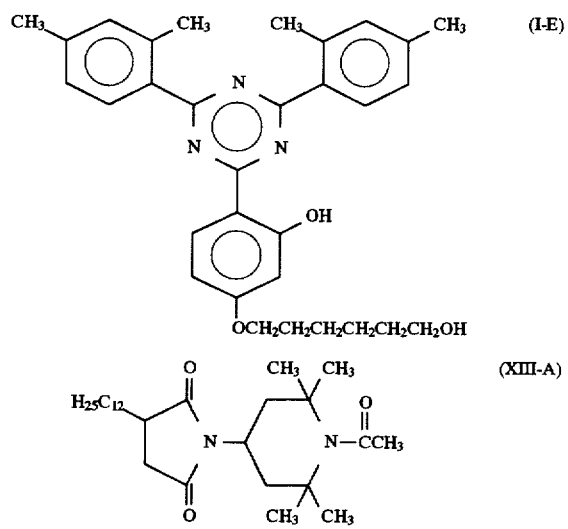

5. LIGHT STABILIZED POLYMERS OF THE INVENTION

The light stable compositions of the invention comprises:
(A) a hydroxy group-containing traizine represented by Formula I

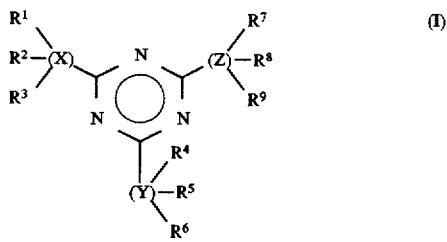

As previously described in section (1) of DETAILED DESCRIPTION OF THE INVENTION.
(B) a polymer to be stabilized, and
(C) a 2,2,6,6-tetraalkylpiperidine compound.

The polymer material to be stabilized is a synthetic resin or polymer such as an acrylic or a polyester film or coating, a polyolefin such as polyethylene or polypropylene usually in the form of a fibers, film, or thick sections, an engineering grade polyester, polycarbonate, polyamide, polystyrene, or polyurethane. Curable or polymerizable mixtures leading to cured or polymerized materials are also included in the definition of polymer materials usable in the composition of the invention.

For example, a curable composition comprises hexamethoxymethyl melamine, a polyhydroxy functional material, an acid cure catalyst, and the two part stabilizer composition of this invention.

The improved method of the invention of stabilizing a polymer utilizes the above compositions. The method, proportion of ingredients, and synergistic combinations are described in greater detail below.

6. IMPROVED METHOD OF STABILIZING POLYMERS

The improved method of the invention of stabilizing a polymer comprises incorporating into said polymer a stabilizingly and synergistically effective amount of the novel synergistic ultraviolet absorber compositions of the invention previously described in section (1) of the DETAILED DESCRIPTION OF THE INVENTION.

The synthetic resins and the polymers to be stabilized by the improved method of the invention are the polymers described in the preceding section and include curable or polymerizable compositions leading to crosslinked or polymeric materials.

If it is preferred to incorporate the stabilizer in the form of a liquid, rather than a solid, the use of saturated or nearly saturated solutions of concentrated stabilizing composition (comprising solvent and novel triazine) is preferred since less solvent (and consequently lower level of volatile organic components) will be introduced into a polymer, coating or film to be stabilized. The following examples are provided for the purpose of illustration only. The examples should not be construed as limiting the invention in any way as variations of the invention are possible which do not depart from the spirit and scope of the invention.

EXAMPLE 1

A mixture of 2,4-di-(2,4-dimethylphenyl)-6-(2,4-dihydroxyphenyl)-1,3,5-triazine (20 g, 0.049 mole), 6-chloro-1-hexanol (7.04 g, 0.05 mole), available from Aldrich Chemicals, Milwaukee, Wis., potassium iodide (0.37 g, 0.0022 mole), PEG 400 (1.9 g, 0.005 mole), available from Aldrich Chemicals, Milwaukee, Wis., sodium hydroxide (2.0 g, 0.05 mole) in methyl isobutyl ketone was reflux (120°–122° C.) for 16 hrs. After cooling to 85° C., water (50 ml) was added and the reaction mixture was acidified with 37% hydrochloric acid to pH 1, and the resulting aqueous layer was removed. The organic layer was washed twice with warm water (75 ml per each washing) and the volatiles were removed under reduced pressure. The oily residue was dissolved in acetone and decolorized with activated charcoal and filtered. Cooling to 22° C. gave 2,4-di-(2,4-dimethylphenyl)-6-[2-hydroxy-4-(6-hydroxy-1-hexyloxy)phenyl]-1,3,5-triazine (I-E) as a pale yellow solid (log), m.p. 117°–118° C. The filtrate was concentrated under a reduced pressure to give a second crop of triazine I-E bringing the total weight of product to 21 g (87% yeild). It was characterized to be 2,4-di-(2,4,dimethylphenyl)-6-[2-hydroxy-4-(6-hydroxy-1-hexyloxy)phenyl]-1,3,5-triazine (I-E).

This example illustrates the preparation of triazine I-E, which is an ultraviolet light stabilizer useful in preparing the composition of this invention, in either of the following two forms:

1. As a concentrated solution in an organic coatings solvent such as acetone, usable as a liquid additive to polymers.
2. As an oganic solvent-soluble solid usable as a solid additive to polymers.

EXAMPLE 2

A mixture of 2,4-di-(2,4-dimethylphenyl)-6-(2,4-dihydroxy-phenyl)-1,3,5-triazine (20 g., 0.049 mole), ethylhexyl glycidyl ether (10.23 g, 0.054 mole), available from Aldrich Chemicals, Milwaukee, Wis., and ethyl triphenylphosphonium bromide (0.2 g, 0.0005 moles) in 70 ml of N-methyl pyrrolidone was stirred at 140° C. for 20 hours. The volatiles were removed under reduced pressure and the residue was dissolved in toluene and washed with water (50 ml). The solvent was then removed in vacuo to give a yellow, low melting solid (26.5 g, 93% yield) characterized to be 2,4-di-(2,4-dimethylphenyl)-6-[2-hydroxy-4-(3-ethylhexyloxy-2-hydroxy-1-propoxy)phenyl]-1,3,5-triazine which contained a secondary hydroxy group, represented by Formula I-G:

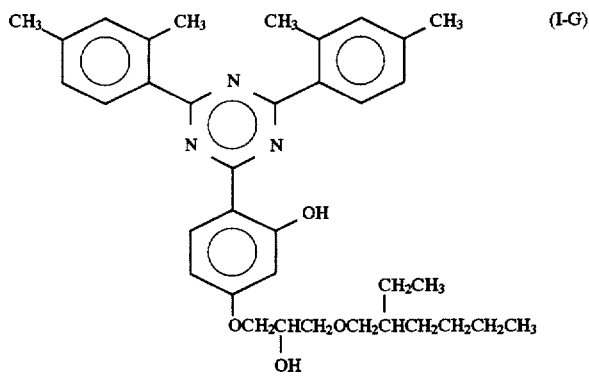

This example illustrates preparation of a secondary hydroxy group-containing triazine I-G, an ultraviolet light stabilizer product useful in the composition of the invention.

EXAMPLE 3

The procedure of Example I was followed with the exception that 1-chloro-2-(2-hexyloxyethoxy)ethane (11.8 g, 0.056 mole) was used in the place of 6-chloro-1-hexanol. The product of the reaction was 2,4-di-(2,4-dimethylphenyl)-6-[2-hydroxy-4-(2-hexyloxy-ethoxyethoxy) phenyl]-1,3,5-triazine(I-H) as an off-white solid from heptane, mp 76°–77° C. (18g, 60% yield). The reaction product contained no hydroxy groups and is represented by Formula I-H.

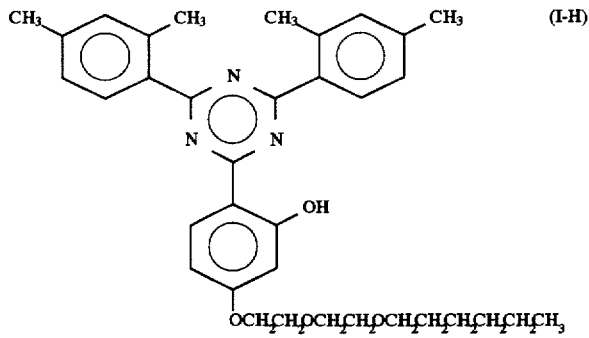

This example illustrates preparation of triazine I-H which contains ether groups and is an example of a triazine-type ultraviolet useful in the composition of the invention.

EXAMPLE 4

1. Test Procedure

The effectiveness of the light stabilizer systems of the following Examples was determined by measuring the gloss retention (ASTM Test Procedure D523) and yellowness index (ASTM Test Procedure D1925) of a coating after exposure in an accelerated weathering unit such as the QUV (ASTM Test Procedure G53).

2. Basic Clear Coating Formulations 13.0 parts ACRYLOID® AT-400 brand of thermosetting acrylic resin (a product of Rohm & Haas Co.) (75% solids); 5.25 parts CYMEL® 303 brand of melamine resin (a product of American Cyanamid Company);

0.15 parts CYCAT® 4040 brand of toluenesulfonic acid catalyst (a product of American Cyanamid Co.) (40% in isopropanol);

3.3 parts xylene; and 3.3 parts butanol.

3. Coatings Formulations with Stabilizer

Three acrylic coating formulations were prepared by adding a hindered amine light stabilizer (HALS) and an ultraviolet absorber (UVA) as follows:

Formulation A

Formulation A was prepared by adding solid 2,4-di-(2,4-dimethylphenyl)-6-(2-hydroxy-4-n-octoxyphenyl)-1,3,5-triazine (n-octyl triazine XIV) at 2 wt % level based on total resin solids, and by adding the hindered amine light stabilizer of formula (XII-A) at 1 wt % level based on total resin solids, to the basic clear coating formulation of Part 2 of this Example.

Formulation B

Method of formulation A was followed with the exception that the triazine of Example I (I-E) was used instead of triazine XIV.

Formulation C

Method of Formulation A was followed with the exception that TINUVIN® 1130 (UVA) and TINUVIN® 440 (HALS) combination depicted below, both products of CIBA-GEIGY Corporation, Hawthorne, N.Y., was used instead of the triazine XIV and piperidine XIII-A.

1. TINUVIN® 1130 (3 Components):

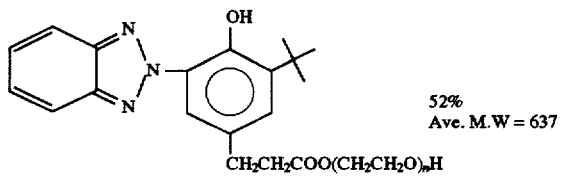

-continued

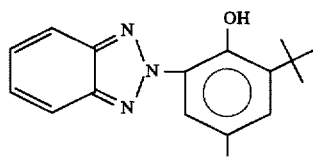

CH₂CH₂COO(CH₂CH₂O)ₙCOCH₂CH₂

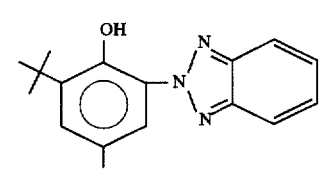

35%
Ave. M.W = 975

Polyethylene Glycol  13%
Ave. M.W = 300

2. TINUVIN® 440:

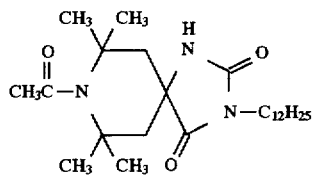

4. Measurement of Stabilizing Effectiveness

BONDERITE® 40 brand of cold rolled steel test panels, coated with a primer and a white base coat based on a thermosetting acrylic resin were coated with the clear resin formulation described above (containing the stabilizer to be evaluated) and cured for 30 min. at 120° C. Clear coating thickness was about 2 mils (0.0508 mm). The coated test panels were subjected to weathering in a QUV tester. In this test, the samples were subjected to alternate cycles of UV light at 70° C. for 8 hours and a humid atmosphere with no UV light at 50° C. for 4 hours. Subsequently, the gloss was measured. The gloss retention of the cured coatings A, B and C, obtained by curing the formulations A, B and C of Example 4, part 3, are summarized in Table 1.

TABLE 1

Gloss Retention of Cured Thermosetting
Acrylic Coating Stabilized with Stabilizer
Combinations A, B, and C.

| | % Gloss (20°) After Exposure (QUV) | | | | | |
|---|---|---|---|---|---|---|
| | 1,400 HOURS | 1,800 HOURS | 2,200 HOURS | 2,600 HOURS | 2,900 HOURS | 3,400 HOURS |
| Coating A XIV + XIII-A | 100 | 99 | 95 | 93 | 73 | 54 |
| Coating B I-E + XIII-A | 100 | 100 | 98 | 98 | 94 | 92 |
| Coating C TIN 1130 + TIN 440 | 53 | 16 | 6 | 4 | 0 | 0 |

This example illustrates that the combination of triazine I-E, which is a hydroxy group-containing triazine of this invention, with hindered amine light stabilizers such as a piperdine compound XIII-A produces:
1. A synergistic stabilizer combination superior to the known synergistic XII + XIII-A combination
2. A more effective stabilizer combination than experimental or commercially available stabilizer combinations.

We claim:

1. A hydroxy group containing aryl triazine ultraviolet absorber represented by the formula:

b.

c.

(XI)

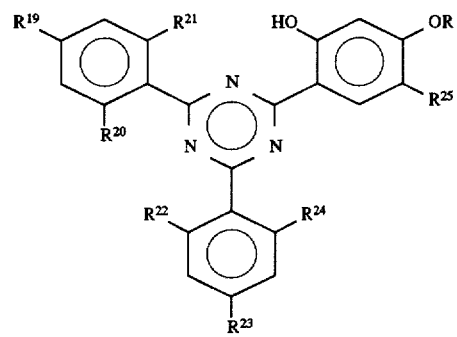

wherein $R^{19}$, $R^{23}$ and $R^{25}$ are independently selected from the group consisting hydrogen, hydroxy, alkyl of 1 to 12 carbon atoms, alkoxy of 1 to 12 carbon atoms, sulfonic, halo, carboxy, haloalkyl and acrylamino;

$R^{20}$, $R^{21}$, $R^{22}$ and $R^{24}$ are independently selected from the group consisting hydrogen, alkyl of 1 to 12 carbon atoms, alkoxy of 1 to 12 carbon atoms, sulfonic, halo, carboxy, haloalkyl and acrylamino; and the R moiety of the OR group is a linear, branched aliphatic or cycloaliphatic alkyl moiety containing 6 to 12 carbon atoms and is:

(1) substituted by one or more hydroxy groups, or (2) substituted by one or more alkoxy groups of 1 to 12 carbon atoms, the so-substituted moiety being further substituted by one or more hydroxy groups.

2. The triazine absorber of claim 1, wherein $R^{19}$, $R^{20}$, $R^{21}$, $R^{22}$, $R^{23}$, $R^{24}$ and $R^{25}$ are independently selected from the group consisting of hydrogen and an alkyl of 1 to 12 carbon atoms.

3. The triazine absorber of claim 2, wherein $R^{19}$, $R^{20}$, $R^{21}$, $R^{22}$, $R^{23}$, $R^{24}$ and $R^{25}$ are independently selected from the group consisting of hydrogen and methyl.

4. The triazine absorber of claim 3, represented by the formula

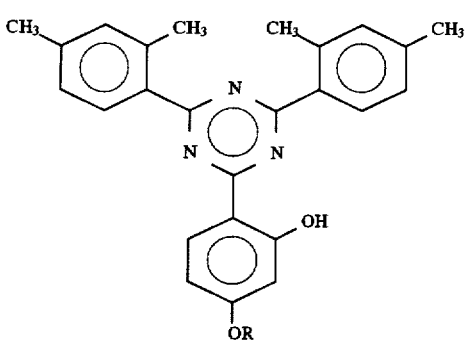

5. The triazine absorber of claim 1, wherein the R moiety of the OR group is a linear, branched aliphatic or cycloaliphatic alkyl moiety containing 6 to 12 carbon atoms and is substituted by one or more hydroxy groups.

6. The triazine absorber of claim 2, wherein the R moiety of the OR group is a linear, branched aliphatic or cycloaliphatic alkyl moiety containing 6 to 12 carbon atoms and is substituted by one or more hydroxy groups.

7. The triazine absorber of claim 3, wherein the R moiety of the OR group is a linear, branched aliphatic or cycloaliphatic alkyl moiety containing 6 to 12 carbon atoms and is substituted by one or more hydroxy groups.

8. The triazine absorber of claim 4, wherein the R moiety of the OR group is a linear, branched aliphatic or cycloaliphatic alkyl moiety containing 6 to 12 carbon atoms and is substituted by one or more hydroxy groups.

9. The triazine absorber of claim 1, wherein the R moiety of the OR group is a linear or branched aliphatic alkyl moiety containing 6 to 12 carbon atoms and is substituted by one hydroxy group.

10. The triazine absorber of claim 2, wherein the R moiety of the OR group is a linear or branched aliphatic alkyl moiety containing 6 to 12 carbon atoms and is substituted by one hydroxy group.

11. The triazine absorber of claim 3, wherein the R moiety of the OR group is a linear or branched aliphatic alkyl moiety containing 6 to 12 carbon atoms and is substituted by one hydroxy group.

12. The triazine absorber of claim 4, wherein the R moiety of the OR group is a linear or branched aliphatic alkyl moiety containing 6 to 12 carbon atoms and is substituted by one hydroxy group.

13. The triazine absorber of claim 1, wherein the R moiety of the OR group is 6-hydroxyhexyl.

14. The triazine absorber of claim 2, wherein the R moiety of the OR group is 6-hydroxyhexyl.

15. The triazine absorber of claim 3, wherein the R moiety of the OR group is 6-hydroxyhexyl.

16. The triazine absorber of claim 4, wherein the R moiety of the OR group is 6-hydroxyhexyl.

* * * * *